United States Patent [19]

Coffee

[11] 4,398,671
[45] Aug. 16, 1983

[54] HOLDERS FOR CONTAINERS USED IN ELECTROSTATIC SPRAYING

[75] Inventor: Ronald A. Coffee, Haslemere, England

[73] Assignee: Imperial Chemical Industries Limited, London, England

[21] Appl. No.: 212,743

[22] Filed: Dec. 3, 1980

Related U.S. Application Data

[63] Continuation-in-part of Ser. No. 78,434, Sep. 24, 1979, Pat. No. 4,275,846, which is a continuation-in-part of Ser. No. 953,774, Oct. 19, 1978, Pat. No. 4,209,134.

[30] Foreign Application Priority Data

Sep. 26, 1978 [GB] United Kingdom ............... 38180/78
Dec. 21, 1979 [GB] United Kingdom ............... 7944150

[51] Int. Cl.³ ............................................. B05B 5/02
[52] U.S. Cl. ................................. 239/690; 361/228
[58] Field of Search ............... 239/3, 690, 691, 696; 361/228

[56] References Cited

U.S. PATENT DOCUMENTS

| | | | |
|---|---|---|---|
| 3,212,211 | 10/1965 | Bennett | 361/235 X |
| 3,495,779 | 2/1970 | Renner et al. | 239/691 |
| 4,120,015 | 10/1978 | Haller | 239/696 X |
| 4,165,022 | 8/1979 | Bentley et al. | 239/704 X |
| 4,186,886 | 2/1980 | Sickles | 239/691 |
| 4,209,134 | 6/1980 | Coffee | 239/690 |

*Primary Examiner*—Evan K. Lawrence
*Attorney, Agent, or Firm*—Cushman, Darby & Cushman

[57] ABSTRACT

A holder for receiving a container which contains a liquid suitable for electrostatic spraying and which has a spray orifice comprises a body having a high voltage generator; a power source therefor; a field-intensifying electrode; electrical connections for connecting the electrode to an output terminal of the high voltage generator and for connecting the output terminal and the field-intensifying electrode to earth; a mounting device complementary to a mounting device on the container for locating the container on the holder with the spray orifice adjacent the electrode, the complementary mounting device having an electrical contact complementary to one on the container; and electrical connections for connecting the contact to the other output terminal of the high voltage generator.

2 Claims, 11 Drawing Figures

HOLDERS FOR CONTAINERS USED IN ELECTROSTATIC SPRAYING

This application is a continuation-in-part of application Ser. No. 78,434 filed Sept. 24, 1979, now Pat. No. 4,275,846 which in turn is a continuation-in-part of application Ser. No. 953,774 filed Oct. 19, 1978 now U.S. Pat. No. 4,209,134 issued June 24, 1980.

This invention relates to holders for containers used in the electrostatic spraying of liquids.

In U.K. Pat. No. 1569707, we have described an apparatus for the electrostatic spraying of liquids. This apparatus is of simple construction, with a low power requirement (it has no moving parts and can readily be run off dry cells); it is thus particularly suited for use as a hand held sprayer in applications where large power sources are not readily available: for example, in spraying crops. Electrostatic spraying of crops also has advantages in promoting even coating of plants, with spray being attracted around behind foliage instead of coating only exposed surfaces; and in reducing spray drift, which is at best wasteful and at worst hazardous to the environment.

The apparatus disclosed in U.K. Pat. No. 1569707 comprises essentially a discharge nozzle; a field-intensifying electrode disposed around the nozzle; a container for supplying liquid to be sprayed to the nozzle; and a high voltage generator for applying a high voltage to the nozzle, the electrode being earthed. In this way a strong electric field may be produced between the nozzle and the electrode, sufficient to atomise liquid passing through the nozzle.

This apparatus is particularly suitable for the application of pesticides at low or ultra-low volume (typically at a spray application rate in the range 0.5 to 10 liters spray liquid per hectare). Low and ultra-low volume spraying have several recognised advantages, as well as being especially suitable where water is not readily available as a spray diluent, but they also have one disadvantage. Of necessity, they must use relatively concentrated pesticidal compositions. Such compositions frequently have a greater or lesser degree of human toxicity, and for this reason it is desirable that they should be handled as little as possible. A particular danger is the decantation of poisonous liquids into beverage bottles.

A pesticide sprayer, to provide the best service, must be reliable and adaptable. Desirably it should be able to spray pesticides of several different kinds. Different pesticides come in different formulations, having different electrical properties, and requiring to be sprayed in differing droplet sizes to give optimum effect. In the apparatus of U.K. Pat. No. 1569707 useful and convenient control over droplet size and spraying properties can be provided by varying the applied voltage; but the size of the nozzle and its position relative to the surrounding electrode may also require adjustment to suit the formulation being sprayed. It is often difficult to do this reliably in the field. Also, pesticide sprayers (spray-tanks, spray-lines and nozzles) normally require careful cleaning between application of different pesticides; otherwise, for example, traces of herbicide may damage crops being sprayed against fungal attack. The need for such cleaning is increased when formulations are to be sprayed electrostatically, since contamination may affect their electrical properties. Thorough cleaning may damage nozzles, leading to incorrect spray application.

The object of the present invention is to provide holders for containers suitable for use in electrostatic spraying apparatus of the kind described in U.K. Pat. No. 1569707 which enable a number of the problems outlined above to be mitigated or overcome.

The container to be used with the holder of the present invention includes:

a spray nozzle at least part of the surface of which is electrically conductive; mounting means for locating the container on the holder with the nozzle adjacent the field-adjusting electrode and insulated therefrom; electrical connections from the nozzle to a contact on the mounting means so placed that when the container is located on the holder by the mounting means the contact can make connection with the other output terminal of the high voltage generator; and a closure or seal for closing the nozzle prior to location on the apparatus.

According to the present invention we provide a holder suitable for receiving the container, the holder comprising a body carrying a high voltage generator, a power source therefor, a field-intensifying electrode, electrical connections for connecting the electrode to an output terminal of the high voltage generator, and mounting means complementary to the mounting means on the container for locating the container on the holder with the spray orifice adjacent the electrode. Throughout this specification, the term 'conducting surface' is intended to include a semi-conducting surface.

Prior to mounting on the holder, the container nozzle is required to be sealed against the emission of liquid. One or more conventional sealing means may be employed, for example a screw cap or a metal foil seal over the nozzle, or both. The container seal may be adapted to be opened when, and preferably only when, located on the holder. Such opening may take place during such location, or subsequently: furthermore, the opening may be actuated mechanically or electrically. Thus, during the action of mounting the container on to the spraying apparatus, a knife or spike on the holder may cut or pierce a metal foil over the nozzle of the container. The container nozzle may be sealed by a valve, e.g. a spring-biassed ball valve which is opened during mounting by contact with a detent on the holder. With such a system the container orifice is automatically closed on removal from the apparatus which is particularly useful when the container still contains liquid. The same desirable end may also be accomplished by use of an electrostatic valve, of the type disclosed in our co-pending application "Electrostatic Valves" (EPO Application No 80302767, filed Aug. 12, 1980).

Preferably means are provided on the holder for maintaining one output terminal of the high voltage generator at or near earth potential. Such means may be a conductor, for connection to earth, for example, a trailing earth wire dependent from the holder. Where such means are provided, it is preferred that the earthed terminal of the high voltage generator is arranged for connection to the field-intensifying electrode rather than to the container nozzle. Charging of the spray is then by direct contact, rather than by induction, and there is a stronger electrostatic field transporting the spray to its (earthed) target.

If desired, one of the two electrical connections of the high voltage generator terminals with the field-intensifying electrode and the container nozzle may be through earth; though a more direct connection is sometimes convenient. The field-intensifying electrode may be of bare metal or may be wholly or partially covered with insulating material.

For most efficient operation the container also requires a means of equalising the external and internal pressure during spraying, for example an air vent, or non-rigid walls.

Containers suitable for use with the invention may be filled with properly formulated spray liquid by the manufacturer, and after the containers are closed, the spray liquid will remain uncontaminated until it is actually sprayed. There is no need to clean spray-tanks, spray-lines or nozzles to avoid contamination, so different products can be sprayed successively without undue loss of time. Toxic hazards through handling by operators are minimised; errors by field operators in mixing and dilution procedures are eliminated. After use, the containers may be returned to the manufacturer for refilling; or may be discarded. Containers may be made from one or more elements of plastics material by, for example, injection moulding or blow moulding, or a combination of the two. The conducting elements of the containers (nozzle, contact and connections) may be provided by metal inserts, or by application of conductive metallic coatings or paints to the container surface or by the use of partly-conducting plastics.

One suitable form of power source is an electrical storage battery. The amount of electrical energy required to atomise liquid is remarkably low. A typical example may be considered: a vessel containing 500 ml of liquid to be sprayed at a rate of 0.1 ml per second, with a droplet size of about 100 microns, and a charge to mass ratio of $5\times10^{-3}$ coulombs per kilgram. The current carried by droplets atomising from the nozzle is thus 0.5 microamperes. The required cell rating is considerably less than that of most readily available torch batteries. An example of another form of power source which may be used in the invention is a solar cell. Suitable high voltages for use in the invention range from about 1 to about 30 kilovolts, and most conveniently from about 5 to about 25 kilovolts.

A specific embodiment of the invention will now be described with reference to the drawings, in which:

FIG. 1 is a perspective view of a container suitable for use with the invention;

FIG. 2 is an end view of a container;

FIG. 3 is a vertical section through the container on the line AA of FIG. 2;

FIG. 4 is a plan view of the holder;

FIG. 5 is a plan view of the collar of the container;

FIG. 6 is a circuit diagram showing the circuit formed when the container is mounted on the holder.

FIGS. 7-11 illustrate a second container and holder according to the invention.

FIG. 7 is a vertical section through the nozzle and neck of the second container.

FIG. 8 is a horizontal section on the line A—A in FIG. 7.

FIG. 9 is a vertical section through a holder for the second container.

FIG. 10 is a circuit design for the holder of FIG. 9.

FIG. 11 is a vertical section through a cap for the nozzle of FIG. 7.

With reference generally to FIGS. 1 to 3 and 5, the container comprises a generally flask-shaped body (1) of blow-moulded high density polyethylene, the neck of which is in liquid-tight sealed engagement with a collar (2) injection-moulded from polyacetal. It contains a solution (40) of 10% by weight of an insecticide in an aromatic hydrocarbon solvent.

The collar (2) is formed of two concentric cylinders (3) and (4) joined near their ends to form an annulus. Within the inner cylinder (4) is a polyacetal plug (5), whose external diameter is somewhat less than that of the internal diameter of the cylinder (4). The plug (5) is held in place within the cylinder (4) by outwardly projecting lugs (6). It thus forms, in cooperation with the cylinder (4), an annular channel (7) of capillary dimensions through which spray liquid may pass. The plug (5) is also provided with a central bore carrying a polythene capillary tube (8) which extends upwardly into the body (1) of the container. The annular nozzle formed by the combination of the plug (5) and the cylinder (4) is closed against liquid leakage by sealing cap (9) (shown in position only in FIG. 3).

The rim (17) of the inner cylinder (4) is coated with electrically conductive paint to form an annular conductor. The conductive rim (17) is connected by an electrically conductive paint strip (18), passing down the inside of the cylinder (4) and over the top rim of the collar, to a brass contact stud (19) on the outside of the collar (2). To prevent current leakage through the spray liquid, the conductive strip (18) is protected within the body (1) of the container by insulating varnish. A projecting key (20) is also formed on the outside of collar (2).

With reference now principally to FIG. 4, the holder for the container comprises a body (21) suitable for holding in the hand carrying a variable high voltage generator (22) (233P, 0–20 kilovolts, 200 microamp module. The body (21) is of generally elongated form, and terminates in a ring (23) of a rigid plastics material, the inside of which is adapted to receive the collar (2) of the container. A key way (24) corresponds to the key (20) on the collar (2). Around the base of the ring (23) is mounted a metal annulus (25), which serves as a field-intensifying electrode. A brass contact stud (27) is mounted on the inside of the ring (23) so as to be able to contact stud (19) on the container. The power source (26) is a bank of dry cells carried in the body (21) of the holder. The positive pole of the power source (26) is connected by an insulated electrical conductor (28) to a switch (29), which, in the 'on' position, leads via a conductor (30) to the positive input terminal of the high voltage generator (22). The negative pole of power source (26) is connected via an insulated electrical conductor (31) to a conductor (32) for connection to earth: the conductor (32) is a metal wire with a bare end for trailing along the ground. The stud (27) connects via an insulated electrical conductor (33) to the positive high voltage output terminal (34) of the generator (22). The negative output terminal (35) of the generator (22) is connected to the earth wire (32), as is the metal annulus (25).

In operation, the container is placed in an upright position, and the sealing cap (9) removed. The ring (23) of the holder is then placed over the collar (2) of the container, over which it is a push fit, and the two mating parts are pushed together. The ring (23) grips the collar (2) sufficiently tightly to hold the container in position; the key (20) on the container cooperates with the key way (24) to hold the container in a position in which contacts (19) and (27) touch. The circuit so formed is shown in FIG. 6. The holder is now used to invert the container over the target to be sprayed, and liquid starts to drip from the channel (7). The switch (29) is at once turned to the 'on' position. This permits current flow from the power source (26) to the generator (22); and this in turn causes a high potential (conveniently 20 kilovolts) to be conveyed from the terminal (34) via contacts (27) and (19) to the electrically conducting surface (17) of the cylinder (4). A strong electrostatic field is thereby created between the charged nozzle (7) and the earthed metal annulus (25), functioning as a field-intensifying electrode. This causes liquid emerging adjacent to the surface (17) to atomise, and be projected downwardly as a fine spray, of controlled particle size, towards any desired target. As the liquid passes out of the container through the annular channel (7), the decreasing pressure within the container is equalised by air passing up through the central capillary tube (18). Spraying is stopped by turning off the switch (29) and turning the container mouth upwards.

Various modifications to the foregoing apparatus will be apparent to those skilled in the art. The container illustrated is intended to be disposable. However, reusable containers may also be made.

The device described includes a conductor for connection to earth in the form of a trailing bare metal wire. This has the disadvantage that it may become caught up or tangled. The device works best with an earth connection; but it need not be of low resistance. The conductor for connection to earth may be, for example a metallised strip along the handle of the holder. When the operator grasps the handle, an electrical pathway to earth is formed through the operator's body. Though this pathway has high resistance, we have found that it is generally adequate. Experiments have shown that, with an arrangement of this kind, the voltage on the container electrode may be up to about one or two hundred volts above that of earth, even when the operator is wearing rubber boots in relatively dry conditions. Such a voltage on the electrode is little different from that of earth, relative to the potential on the nozzle of several thousand volts. The current flowing through the operator is so small that there is no danger to him whatever, nor can he even feel anything.

A further embodiment of the invention, more suited to mass production using plastics moulding techniques, is illustrated in FIGS. 7–11. The container (48), shown in FIGS. 7 and 8, comprises a bottle (49), formed by processes including blow-moulding from clear polyethylene terephthalate, having a shoulder (50) with an exterior thread (52) and a neck (51) with an exterior thread (53). The neck (51) carries an annular nozzle (54) threaded thereon. This nozzle is injection-moulded from conductive plastics material (nylon containing 30% by weight carbon black) in two pieces (55) and (56) forming respectively the outer and inner wall elements of the nozzle (54). Outer wall (55) comprises a tube (58) having at its upper end an enlarged skirt (59) carrying inner and outer threads (60) and (61). From the upper end of skirt (59), a resiliently deformable flange (63) extends outwardly.

Figure 1:
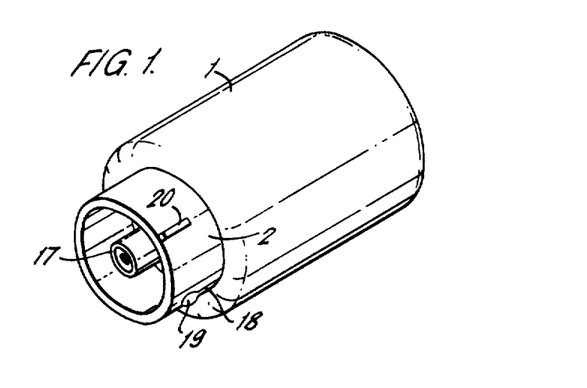
Figure 2:
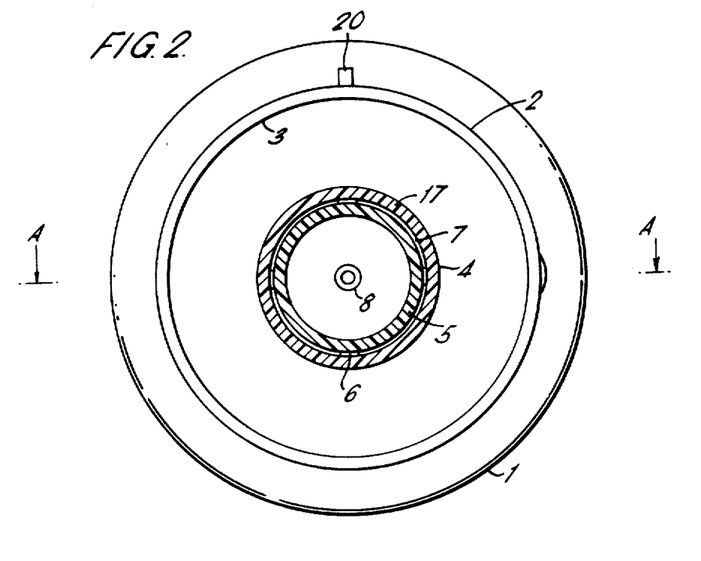
Figure 3:
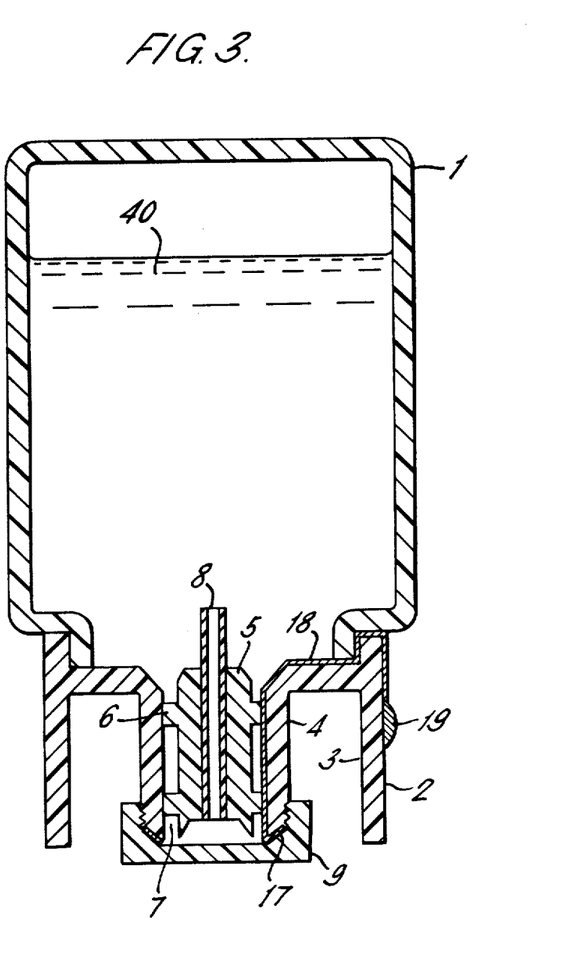
Figure 4:
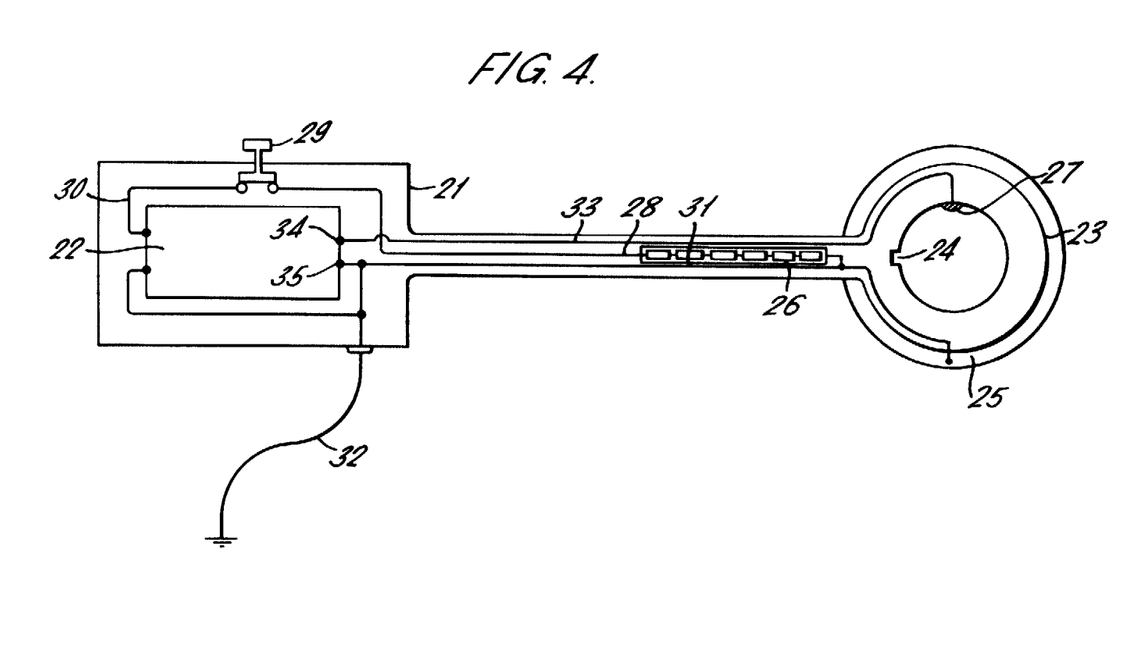
Figure 5:
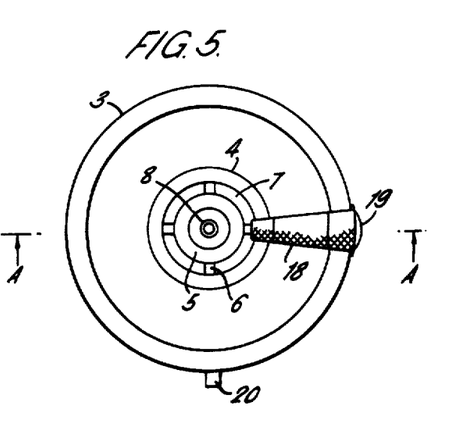
Figure 6:
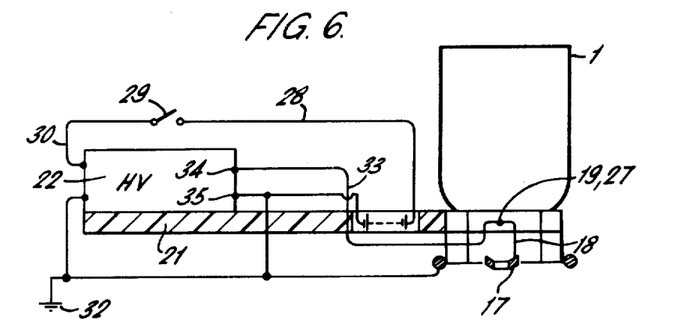
Figures 7, 8:
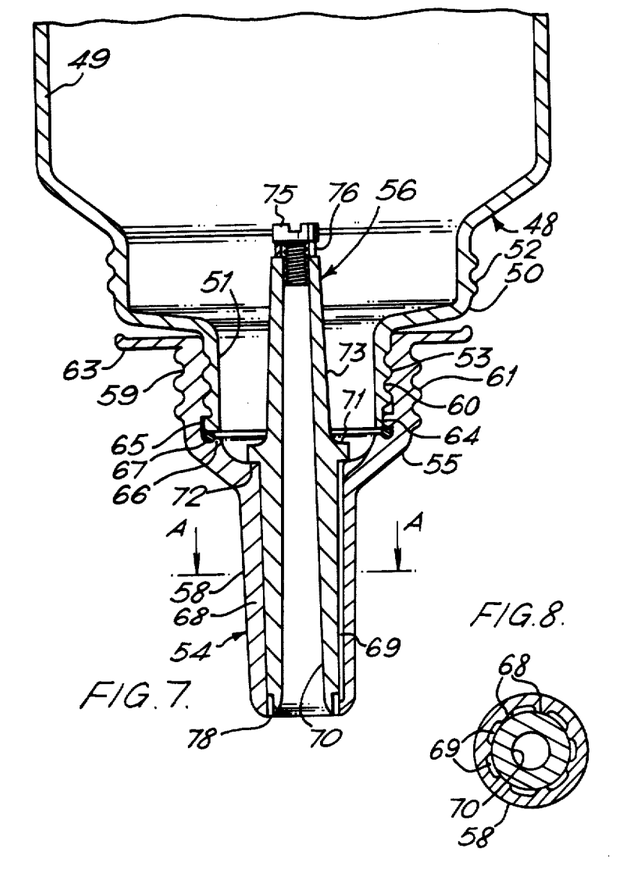

Below inner thread (60) a set of ratchet teeth (64) are formed round the inner circumference of skirt (59). Thread (60) on skirt (59) mates with thread (53) on bottle (59); when the two are screwed together ratchet teeth (64) engage with a mating set of ratchet teeth (65) fixed in the outer lip of neck (51) of the bottle (49). This prevents bottle (49) and nozzle (54), once assembled, from being taken apart again. At the base of skirt (59) a circumferential wier (66) supports a resilient rubber O-ring (67); this acts as a liquid-tight seal between nozzle (54) and the lip of neck (51).

Tube (58) is formed with seven vertical ribs (68), separated by channels (69). Within tube (58) is carried inner wall element (56) of the annular nozzle (57). This is also generally tubular in shape and comprises a bottom portion (70) which is a push-fit into tube (58), fitting snugly within it against ribs (68); a central radial flange (71) which abuts the heads (72) of the ribs (68), and an upper portion (73) with a mouth (74) partially closed by a threaded bolt (75) which is a push-fit therein. The mouth (74) has three castellations (76) which expose part of the thread of the nut (75); the inner bore of mouth (74) is smooth, not threaded. The lower end of bottom portion (70) is formed with a circumferential indentation forming an annular orifice (78) between inner and outer walls (55) and (56). The channels (69) lead into this orifice (78).

Figures 10, 11:
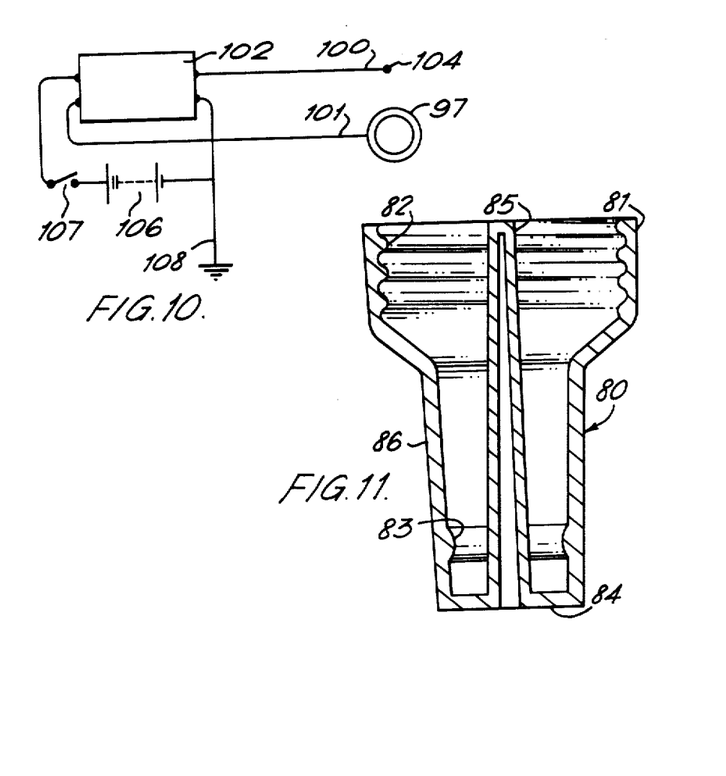

FIG. 11 shows a cap (80) formed of nylon which may be screwed on to nozzle (54) to retain liquid during carriage and storage. It comprises a skirt (81) externally milled with internal thread (82) for mating with the external thread (61) on the nozzle (54). Skirt (81) has a dependent wall (86) fixed with an inner circumferential projection (83) which in use forms a liquid-tight seal against the outer wall of the tube (58). From the base (84) of cap (80) a long nose (85) projects upwardly; in use this has no sealing function, but fills most of the space between nut (75) and projection (83) so that the minimum of liquid is lost when cap (80) is removed.

Figure 9:
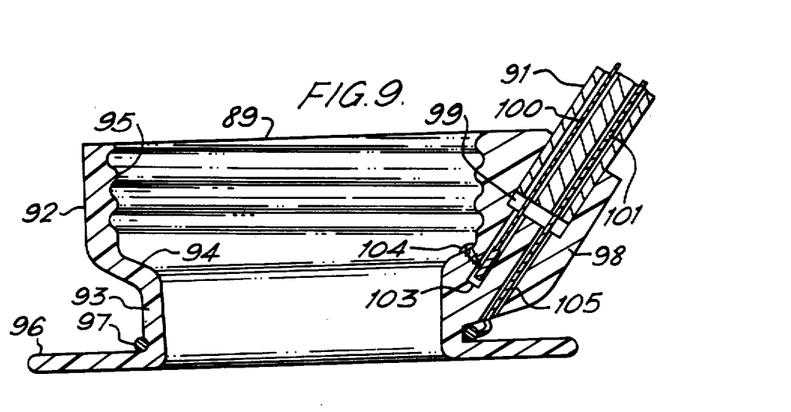

FIGS. 9 and 10 show a holder (90) for container (48) consisting of a plastics support (89) and a carrying handle (91). The support (89) is of tough rigid non-conducting plastics material (e.g. glass-filled nylon) and comprises two short co-axial hollow cylinders (92) and (93) connected by a sloping shoulder (94). The upper cylinder (92) has an internal thread (95) which will receive and mate with the external thread (52) of bottle (49). Lower cylinder (93) is wide enough to admit nozzle (54) carrying cap (80), with a small clearance. The bottom of cylinder (93) is formed with an outwardly-directed radial flange (96). Just above flange (96), at the base of cylinder (93), is a bare metal annulus (97). At one side of support (89) is a large lug (98), formed with a socket (99) for receiving the end of carrying handle (91), a rod of insulating plastics material (such as fiberglass). Within handle (91) are carried two electrical leads (100) and (101), the former being connected to one output terminal of 25 KV high voltage generator (102) carried in the handle (91), and the latter being connected to earth. Lead (100) is accommodated in blind bore (103) adjacent the interior surface of shoulder (94), and makes contact with round-headed self-tapping metal screw (104). Lead (101) passes through bore (105) and is connected to metal annulus (97). As shown in the circuit diagram of FIG. 10, generator (102) is powered by four 1.5 volt flashlight batteries (106) through a spring-loaded push button switch (107). Generator (102), batteries (106) and switch (107) are all mounted on handle (91). The earth connection (108) is provided through a trailing bare wire twisted into in a plastic twine base.

In use, bottle (49) is first filled with a suitable liquid for spraying (e.g. a 10% by weight formulation of a fungicide in a hydrocarbon solvent, the formulation having a resistivity of $1 \times 10^8$ ohm cm and a viscosity of 5 centistokes, both measured at 20° C.). Nozzle (54) is then screwed on to thread (53), and ratchet teeth (64) and (65) engage, fixing nozzle (54) permanently in position. Cap (80) is then screwed on to thread (61). The container (48) so formed is now transported to the site at which it is desired to use it. Here it is screwed into holder (89), using threads (52) and (95). Flange (63) contacts the head of screw (104). Handle (92) is now used to hold container (48) nozzle downwards over the target it is desired to spray, and cap (80) is removed. Liquid begins to drip out of annulus (78), while air is sucked into the container up the central bore of insert (56). To enter the container, air has to pass along the long helical groove formed between the thread of bolt (75) and the smooth inner surface of mouth (74). The generator (102) is activated by depressing the switch (107), thereby communicating a potential of 25 KV to the nozzle (54) via lead (100), screw (104) and flange (63). A powerful electric field is generated between the charged nozzle orifice (78) and the earthed conductor (97). This draws out the liquid leaving the orifice (78) into ligaments, which break up into highly charged particles of uniform size, which are attracted to and evenly cost the target.

The form of nozzle shown in FIGS. 7-11 produces a steady flow-rate after a short period (of the order of 45 seconds) in which equilibrium is reached. The equilibrium flow-rate for a liquid of given viscosity is dependent on the width and breadth of the channels (69) and the length and cross-section of the helical air-bleed channel. In the embodiment shown, the seven channels (69) are 0.3 mm deep and 1.6 mm wide, the annular orifice being 0.3 mm in width with an external diameter of 13 mm; the path of the helical air-bleed is about 9–10 cm long, with a cross-section of about 0.4 sq. mm. and the resulting flow-rate is about 0.07 ml/second. For greater or lesser flow-rates, it is simplest to change the number of channels (69) rather than their depth or thickness, e.g. to 4 or 16 channels to approximately halve or double the flow-rate, respectively. As well as giving a steady flow-rate, this nozzle is not sensitive to tilting and continues to operate satisfactorily when held at an angle of, e.g., 30° to the vertical.

Accordingly, the invention further comprises a container for the electrostatic spraying of liquids including a vessel having a neck, an electrically-conductive nozzle mounted in said neck and having a body, a mouth for dispensing liquid from the vessel and an air-bleed for feeding air into the vessel:

said body comprising vertically aligned co-axial outer and inner tubes, the outer tube being shorter and having a height at least twice its diameter and said inner tube having an upper end extending at least into the neck of the vessel;

said mouth being formed by the radial gap between adjacent lower ends of the tubes;

ribs being provided on the surface of one tube to space it from the second tube and to form channels communicating with the vessel to deliver liquid therefrom to the mouth;

said air-bleed comprising a bung supported within the bore of the upper end of said inner tube and a projecting helical thread between the bung and the bore providing an extended helical pathway through which air can enter the vessel.

The apparatus of the invention has been described with particular reference to its use in pesticide spraying, in particular of compositions comprising pesticides in organic liquid carriers, for which it has special advantages. However, it also has advantages in respect to spraying of coatings or paints, for example by the home decorator. Holders for the container are conveniently adapted for holding in the hand; but they may also comprise means for self-propulsion, e.g. being carried in or forming part of vehicles such as tractors or aircraft, when they may support more than one container. In this case, the power source may be a battery or generator carried in the vehicle.

We claim:

1. A holder suitable for receiving a container containing a liquid suitable for electrostatic spraying and having a spray orifice, said holder comprising a body having a high voltage generator; a power source therefor; a field-intensifying electrode; electrical connections for connecting the electrode to an output terminal of the high voltage generator and for connecting said one output terminal and said field-intensifying electrode to earth; mounting means complementary to mounting means on the container for locating the container on the holder with the spray orifice adjacent the electrode, said complementary mounting means having an electrical contact complementary to one on the container; and electrical connections for connecting said contact to the other output terminal of the high voltage generator.

2. A holder suitable for receiving a container of the kind which includes an electrostatic spray nozzle for dispensing liquid from the container, mounting means and an electrical contact carried by the mounting means and electrically connected to the nozzle, said holder comprising: a holder body adapted to be manually held by an operator; a high voltage generator having positive and negative inputs and positive and negative outputs supported on said body; a field-intensifying electrode supported on said body; a power source having positive and negative outputs supported on said body; mounting means on the holder body complementary to the mounting means on the container for locating the container on the holder body so that the spray nozzle is adjacent said field-intensifying electrode, said complementary mounting means including an electrical contact adapted to engage the electrical contact on the container when the two mounting means are engaged; and electrical connections carried by said holder body for connecting one of said power source outputs to one of said generator inputs, for connecting one of said generator outputs to said electrical contact and for connecting the other power source output, the other generator input, the other generator output and said field-intensifying electrode to earth, said electrical connections including a manually operable switch for selectively connecting and disconnecting said power source to and from said electrical contact.

* * * * *